US006073837A

United States Patent [19]

Milne

[11] Patent Number: 6,073,837

[45] Date of Patent: Jun. 13, 2000

[54] AUTOMATED TELLER MACHINE INCLUDING A MECHANISM WHICH RETRACTS A STACK OF CURRENCY NOTES WHICH HAS BEEN PRESENTED TO A USER

[75] Inventor: Douglas L. Milne, Dundee, United Kingdom

[73] Assignee: NCR Corporation, Dayton, Ohio

[21] Appl. No.: 08/883,475

[22] Filed: Jun. 25, 1997

[30] Foreign Application Priority Data

Oct. 15, 1996 [GB] United Kingdom .................. 9621501

[51] Int. Cl.$^{7}$ .................................................... G06K 17/60

[52] U.S. Cl. ............................. 235/379; 235/380; 902/8; 902/14; 221/195

[58] Field of Search .................................... 235/379, 380, 235/381, 382; 902/8, 10, 12, 14, 16; 209/534; 221/191, 195, 197, 15

[56] References Cited

U.S. PATENT DOCUMENTS

| | | | |
|---|---|---|---|
| 4,385,285 | 5/1983 | Horst et al. | 235/379 |
| 4,607,155 | 8/1986 | Nao et al. | 235/379 |
| 4,894,783 | 1/1990 | Milne | 364/479 |
| 5,590,790 | 1/1997 | Saunders | 209/534 |
| 5,735,516 | 4/1998 | Gerlier et al. | 209/534 |
| 5,836,577 | 11/1998 | Arikawa et al. | 209/534 |

FOREIGN PATENT DOCUMENTS

| | | |
|---|---|---|
| 0535543 | 4/1993 | European Pat. Off. . |
| 29622427 | 7/1997 | Germany . |

*Primary Examiner*—Donald Hajec
*Assistant Examiner*—Daniel St.Cyr

[57] ABSTRACT

An automated teller machine includes a measuring degree (38) to measure the cross-sectional area in the direction of the travel of a bundle of currency notes as it travels to the currency dispense slot (18), and also as it travels from the dispense slot to the purge bin (30) on retraction after a pre-determined time interval. Comparison of the two values indicates whether one or more notes have been removed by a user before the bundle is retracted.

9 Claims, 3 Drawing Sheets

AUTOMATED TELLER MACHINE INCLUDING A MECHANISM WHICH RETRACTS A STACK OF CURRENCY NOTES WHICH HAS BEEN PRESENTED TO A USER

BACKGROUND OF THE INVENTION

This invention relates to an improved Automated Teller Machine (ATM) especially to an ATM which is less susceptible to fraudulent practices than known ATMs.

When an ATM, in response to a transaction request, presents at least one currency note through its currency dispense slot, it is known to provide a timed mechanism so that if the presented currency is not removed within a certain time interval, it is retracted into the ATM and diverted to a purge bin.

In some cases, especially when a bundle of currency notes is presented, a fault in the mechanism may make it difficult for the user to remove the notes, which are then retracted and purged.

In one type of fraudulent practice some notes from the presented bundle are carefully taken by the reuser, and the remainder left for retraction. In such a case, the ATM record indicates that the requested sum has been purged, but the user has in fact taken a smaller sum.

At present, it is not possible to prevent or record such a fraudulent practice.

SUMMARY OF THE INVENTION

It is the object of the invention to provide an arrangement in an ATM to indicate whether the bundle of currency notes presented to a user, and any bundle retracted to the purge bin, comprise the same number of notes.

According to the invention there is provided an Automated Teller Machine comprising a processor, a card reader, an input device, a display screen, a dispense slot, a purge container, a transport means to transport at least one currency note to the dispense slot, and a retraction device to retract currency notes presented through the dispense slot after a pre-determined period and to direct said notes to the purge container, characterized by measuring means to measure the cross sectional area in the direction of travel of said at least one currency note both as it travels to the dispense slot and as it travels from the dispense slot to the purge container; and comparison means to compare the measured areas and to indicate any difference.

BRIEF DESCRIPTION OF THE DRAWINGS

The invention will now be described by way of example only with reference to the accompanying wings in which.

DETAILED DESCRIPTION

Figure 1:
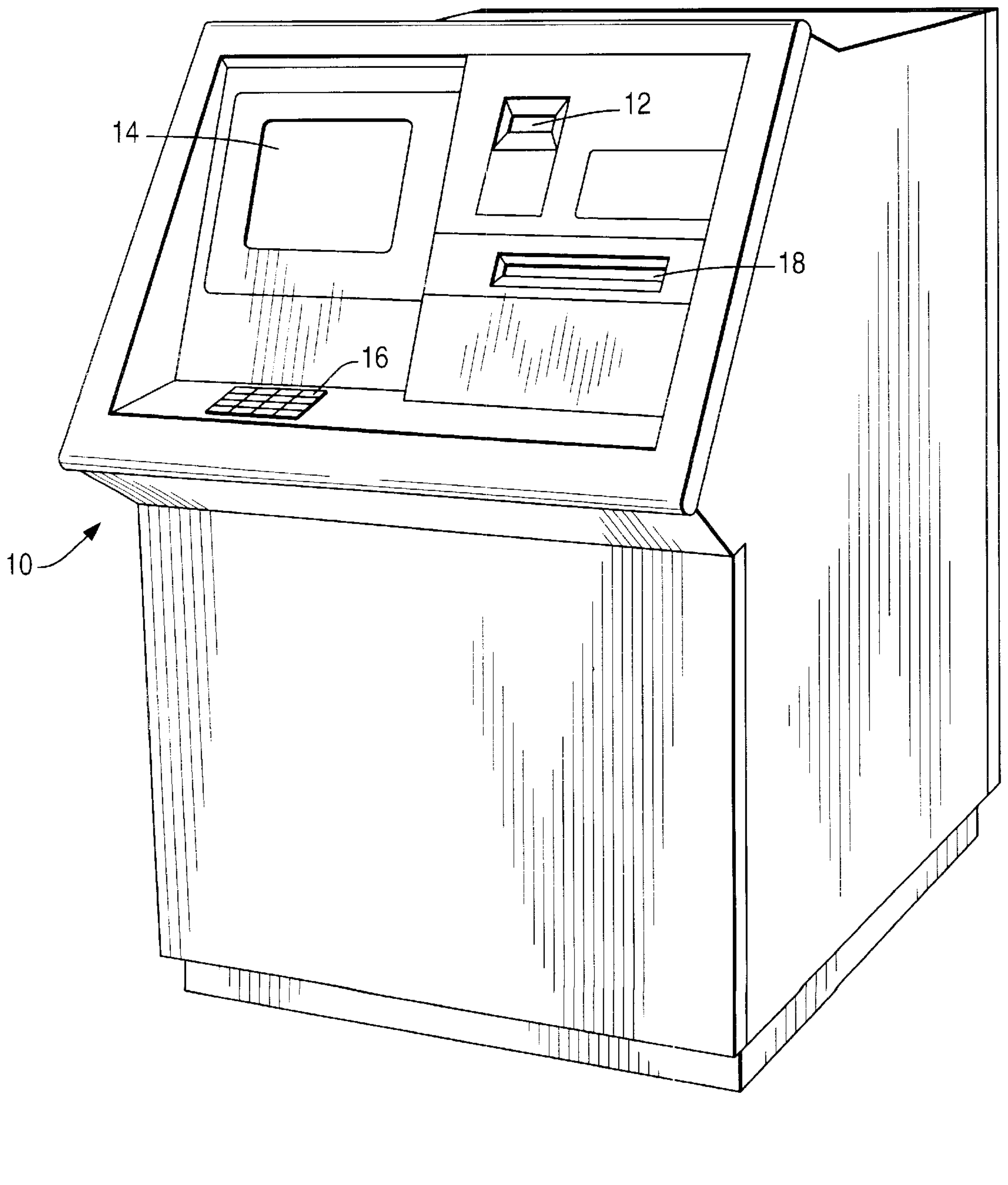
FIG. 1 is a view an ATM.

In FIG. 1 an ATM 10 has a card reader 12, a display screen 14, a key board 16, and a cash dispense slot 18.

Figure 2:
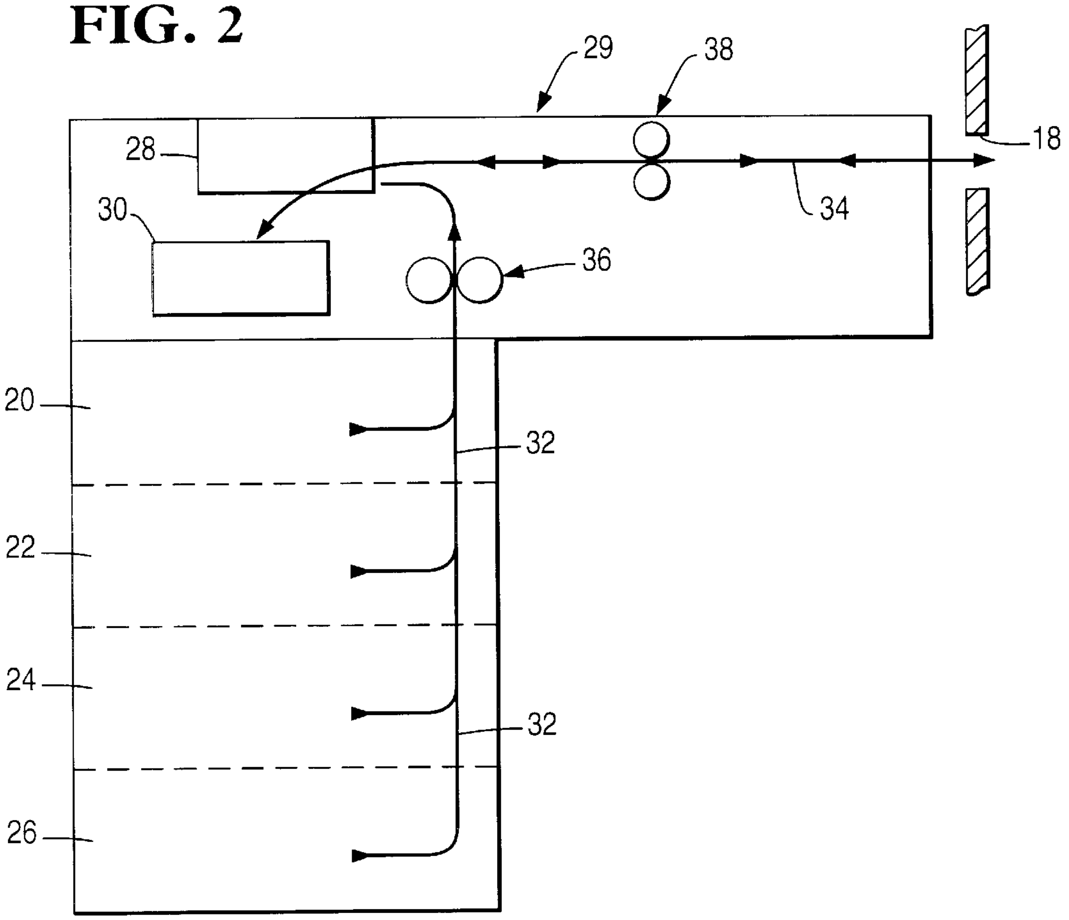
FIG. 2 is a schematic diagram of part of an ATM, indicating the paths followed by currency note dispense and a purge process.

In FIG. 2, within the ATM 10 there are four currency cassettes 20,22,24,26, and a presenter unit 29 containing a stacker 28 and a purge bin 30. In response to an authorized transaction request by a user, notes to make up the requested sum are picked by known pick means (not shown) from one or more of the cassettes 20,22,24,26. Each note is transported by known transport means (not shown) along the path indicated at 32 to the stacker 28. Once the requested sum stacked in the stacker, the bundle of notes is transported by known transport means (not shown) along the path indicated at 34 to the cash dispense slot 18. If the bundle is not removed within a pre-set time, it is retracted along the path 34 to the purge bin 30.

As each note passes from the cassette to the stacker 28, it passes through a thickness sensor indicated schematically at 36 which senses whether two or more notes have been picked together in error. If so, the mispicked notes are directed to the purge bin 30.

The thickness sensor 36 may be a strain gauge thickness sensor or a linear variable displacement transformer (LVDT) or any other known device capable of providing an indication of whether two or more notes have been picked.

One such LVDT is described in our U.S. Pat. No. 4,894,783, and operates by passing the note or notes between two rollers having diameters in known integral relationship, e.g. 2:1, with the larger roller circumference being greater than the length of the currency notes. Deflection of one roller as a note or notes passes between the rollers is measured at regular intervals by the LVDT and the results are summed, giving an integral value related to the cross-sectional area of the note or notes in the direction of travel. The value is corrected by subtraction of a measurement made with no notes between the operating rollers, to correct for non-uniformity. The corrected value is an indication of whether one, two or more notes have passed between the rollers.

In the ATM illustrated in FIG. 2 there is a further thickness sensor 38 positioned in the path 34. The sensor 38 may be an LVDT device, and is preferably an LVDT device as disclosed in our U.S. Pat. No. 4,894,783.

As the bundle of notes passes from the stacker 28 to the dispense slot 18, the device 38 measures the cross-sectional area of the bundle in the direction of travel, thus indicating the number of notes in the bundle. The measured value is stored.

If the bundle is not taken from the dispense slot 18 by the user, or if some notes are removed and others left, the bundle or remaining bundle is retracted along the path 34 and passes through the LVDT device 38 a second time, when a second measurement of cross-sectional area is made and stored.

Figure 3A:
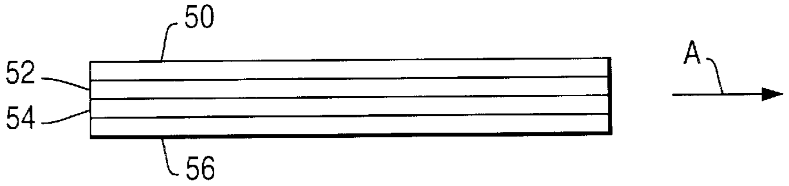
FIG. 3 shows cross-sectional areas of three bundles of notes.
Figure 3B:
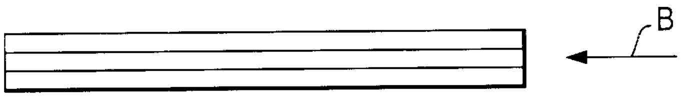
Figure 3C:
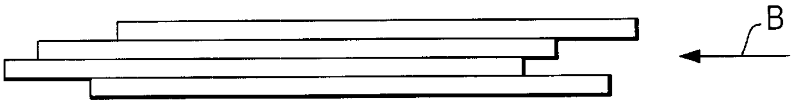

If the two stored values are identical, the bundles are unchanged. If the second stored value is lower, at least one note has been removed. This can be seen by inspection of FIG. 3(*a*) which shows the longitudinal cross-section through four bank notes 50,52,54,56 traveling in the direction of the arrow A through the LVDT device 38. If, on retraction in the direction of the arrow B, only three notes remain, as seen from FIG. 3(*b*), the cross-sectional area is smaller.

If an honest user is genuinely unable to remove the presented notes, the bundle when retracted may be spread in the direction of travel and will have a different profile. If the simple measurement of bunch thickness were to be made, difficulties in comparison could occur. With a measurement of cross-sectional area in the direction of travel, the same number of notes have the same total area, whatever the profile of the bundle. This can be seen by a comparison of FIGS. 3(*a*) and 3(*c*).

In this application of the LVDT device, the circumference of the larger roller must be greater than the maximum likely length of a spread bundle of notes.

Figure 4:
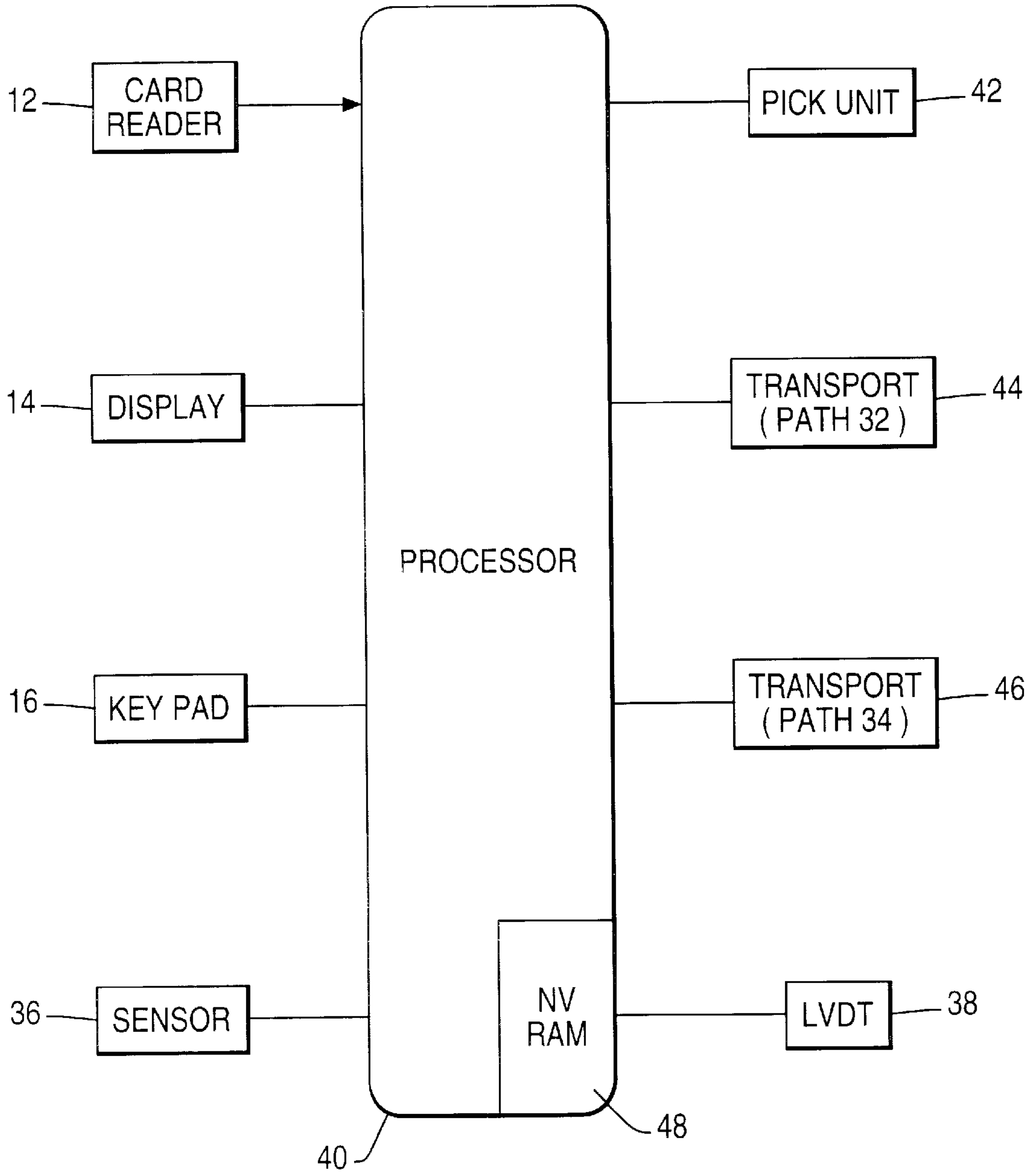
FIG. 4 is a schematic diagram of the control arrangements of the ATM according to the invention.

A control circuit for the ATM is shown in FIG. 4. The ATM has a processor 40 connected to the card reader 12, display 14 and keypad 16. The processor also receives signals from the sensor 36, and controls the pick unit 42, transport device 44 for path 32, and transport device 46 for path 34. The LVDT device 38 is connected to a non-volatile RAM 48 forming part of the processor 40.

In operation, the processor 40 responds to user instructions, which are input by means of the keypad 16, to operate the pick unit 42 to pick the requested sum from the cassettes 20,22,24,26 and to operate the transport means 44 to remove the picked notes along the path 32 and through the thickness sensor 36. If two or more notes are picked together, the mispicked notes are diverted to the purge bin 30. The requested sum is assembled in the stacker 28, and the processor 40 then operates a transport mechanism 46 to move the bundle of notes along the path 34 to the cash dispense slot 18.

A pre-determined time after presentation at the dispense slot, an optical sensor (not shown) is interrogated by the processor 40 to determine if one or more notes remain in the dispense slot 18. If at least one note is detected, the processor 40 operates the transport mechanism 46 in reverse to withdraw the note or notes to the purge bin 30.

As the bundle of notes passes from the stacker unit 28 to the dispense slot 18, it passes through the LVDT device 38 which provides a signal to the NVRAM 48, indicating the cross-sectional area of the bundle. The value is stored. If the bundle is retracted to the purge bin, the second measured value of cross-sectional area is also stored in the NVRAM, and the bundle is deposited in the purge bin 30.

The processor 40 then interrogates the NVRAM 48, and compares the two stored values. A record is kept by the processor as to whether the values are identical or different, and the record is associated with the particular user transaction in the ATM. If the user has fraudulently removed one or more notes, appropriate action can be taken.

It is an advantage of use of the non-volatile RAM 48 that, even if there is a power failure in mid-transaction, the measured value of cross-section of area is not lost.

What is claimed is:

1. An automated teller machine (ATM) comprising:

means defining a dispense slot through which a stack of currency notes can be presented to a user carrying out a transaction at the ATM;

a purge container;

a first transport mechanism for transporting a stack of currency notes to the dispense slot to present the stack of currency notes to a user;

a second transport mechanism for (i) retracting a stack of currency notes which has been presented through the dispense slot to a user after elapse of a predetermined amount of time since the stack of currency notes has been presented through the dispense slot to the user, and (ii) transporting the retracted stack of currency notes to the purge container;

a measuring device for (i) measuring a cross-sectional area of a stack of currency notes when the stack of currency notes is transported by the first transport mechanism to the dispense slot to present the stack of currency notes to a user and providing a first signal indicative thereof, and (ii) measuring a cross-sectional area of a stack of currency notes when the stack of currency notes is transported by the second transport mechanism from the dispense slot to the purge container and providing a second signal indicative thereof; and a comparator for comparing the first and second signals and providing a third signal which is indicative of any difference between the first and second signals to indicate any difference between the cross-sectional area of the stack of currency notes which has been transported by the first transport mechanism to the dispense slot and the cross-sectional area of the stack of currency notes which has been transported by the second transport mechanism from the dispense slot to the purge container.

2. An ATM according claim 2, wherein the measuring device comprises (i) first and second co-operating rollers, one of the rollers having a diameter which is an integral multiple of the other roller, the axis of one of the rollers being moveable relative to the axis of the other roller, and (ii) a linear variable displacement transformer for measuring the relative displacement of the moveable roller.

3. An ATM according to claim 1, wherein the comparator includes a processor which records the third signal and associates the third signal with the particular user carrying out the transaction at the ATM.

4. An automated teller machine (ATM) comprising:

a stacker for providing a stack of currency notes to be presented to a user;

means defining a dispense slot through which a stack of currency notes can be presented to the user;

a purge container;

means defining a first transport path along which a stack of currency notes can be transported from the stacker to the dispense slot to present the stack of currency notes through the dispense slot to the user;

means defining a second transport path along which a stack of currency notes which has been presented through the dispense slot to a user can be transported from the dispense slot to the purge container;

the first and second transport paths having a common transport path portion in the vicinity of the dispense slot;

a first transport mechanism for transporting a stack of currency notes along the first transport path from the stacker to the dispense slot to present the stack of currency notes through the dispense slot to the user;

a second transport mechanism for (i) retracting a stack of currency notes which has been presented through the dispense slot to a user after elapse of a predetermined amount of time since the stack of currency notes has been presented through the dispense slot to the user, and (ii) transporting the retracted stack of currency notes to the purge container;

a measuring device positioned along the common transport path portion and for (i) measuring a cross-sectional area of a stack of currency notes when the stack of currency notes is transported in one direction along the common transport path portion from the stacker to the dispense slot and providing a first signal indicative thereof and (ii) measuring a cross-sectional area of a stack of currency notes when the stack of currency notes is transported in an opposite direction along the common transport path portion from the dispense slot to the purge container and providing a second signal indicative thereof; and a comparator for comparing the first and second signals and providing a third signal which is indicative of any difference between the first and second signals to indicate any difference between the cross-sectional area of the stack of currency notes which has been transported in the one direction along the common transport path portion from the stacker to the dispense slot and the cross-sectional area of the stack of currency notes which has been transported in the opposite direction along the common transport path portion from the dispense slot to the purge container.

5. An ATM according to claim 4, wherein the measuring device comprises (i) first and second co-operating rollers, one of the rollers having a diameter which is an integral multiple of the other roller, the axis of one of the rollers being moveable relative to the axis of the other roller, and (ii) a linear variable displacement transformer for measuring the relative displacement of the moveable roller.

6. An ATM according to claim 4, wherein the comparing means includes a processor which records the third signal and associates the third signal with the particular user carrying out the transaction at the ATM.

7. An ATM according to claim 4, further comprising (i) a number of currency cassettes for storing currency notes to be dispensed to a user carrying out a transaction at the ATM, (ii) means defining a third transport path along which currency notes can be transported from the currency cassettes to the stacker to provide a stack of currency notes to be presented to a user, and (iii) another measuring means disposed along the third transport path for measuring a cross-sectional area of a number of currency notes transported along the third transport path from one of the currency cassettes to the stacker and providing a fourth signal indicative thereof.

8. A method of operating an automated teller machine (ATM), the method comprising the steps of:

(a) measuring a cross-sectional area of a stack of currency notes to be presented through a dispense slot to the user;

(b) presenting the stack of currency notes through the dispense slot to the user;

(c) retracting the stack of currency notes which has been presented to the user after elapse of a predetermined amount of time since the stack of currency notes has been presented through the dispense slot to the user;

(d) transporting the retracted stack of currency notes to a purge bin;

(e) measuring a cross-sectional area of the stack of retracted currency notes when the retracted stack of currency notes is transported to the purge bin; and (f) comparing the measured cross-sectional area of the presented stack currency notes with the measured cross-sectional area of the retracted stack of currency notes to indicate any difference therebetween.

9. A method according to claim 8, further comprising the steps of:

(g) recording any difference in cross-sectional area between the measured cross-sectional area of the presented stack currency notes and the measured cross-sectional area of the retracted stack of currency notes; and (h) associating any recorded difference with the particular user carrying out the transaction.

* * * * *